United States Patent [19]
Tsui et al.

[11] Patent Number: 5,396,250
[45] Date of Patent: Mar. 7, 1995

[54] SPECTRAL ESTIMATION OF RADAR TIME-OF-ARRIVAL PERIODICITIES

[75] Inventors: James B. Y. Tsui, Dayton; Rudy L. Shaw, Huber Heights; David L. Sharpin, Springfield, all of Ohio

[73] Assignee: The United States of America as represented by the Secretary of the Air Force, Washington, D.C.

[21] Appl. No.: 187,356

[22] Filed: Jan. 27, 1994

Related U.S. Application Data

[63] Continuation-in-part of Ser. No. 986,166, Dec. 3, 1992, abandoned.

[51] Int. Cl.$^6$ .............................................. G01S 7/40
[52] U.S. Cl. ........................................ 342/13; 342/196
[58] Field of Search ............................. 342/13, 196

[56] References Cited

U.S. PATENT DOCUMENTS

| | | | |
|---|---|---|---|
| 3,714,654 | 1/1973 | Wicks et al. | 342/13 |
| 3,940,768 | 2/1976 | Olsen et al. | 342/13 |
| 3,955,200 | 5/1976 | Miller | 343/18 R |
| 4,040,054 | 8/1977 | Overman | 342/13 |
| 4,209,835 | 6/1980 | Guadagnolo | 342/13 X |
| 4,303,921 | 12/1981 | Fitzgerald et al. | 342/13 |
| 4,394,642 | 7/1983 | Currie et al. | 340/347 DD |
| 4,516,220 | 5/1985 | Baumann | 364/715 |
| 4,518,947 | 5/1985 | Poston et al. | 340/347 DD |
| 4,568,915 | 2/1986 | Gutleber | 340/347 DD |
| 4,721,958 | 1/1988 | Jenkin | 342/13 |
| 4,879,561 | 11/1989 | Inkol | 342/195 |
| 4,918,455 | 4/1990 | Maier | 342/13 |
| 4,928,105 | 5/1990 | Langner | 342/192 |
| 5,056,105 | 10/1991 | Darmon et al. | 375/1 |
| 5,063,385 | 11/1991 | Caschera | 342/13 |
| 5,115,246 | 5/1992 | Thomas, Jr. et al. | 342/195 |

Primary Examiner—John B. Sotomayor
Attorney, Agent, or Firm—Bernard E. Franz; Thomas L. Kundert

[57] ABSTRACT

Disclosed is a method to extract the periodic properties (or Pulse Repetition Intervals (PRIs)) of radar signals whose time-of-arrival at an airborne platform have been time tagged by an Electronic Warfare (EW) receiver. The PRIs are determined using a modified Discrete Fourier Transform (DFT) written as $$X(k) = \sum_{T_i} e^{\frac{-j2\pi T_i k}{N}}$$

where k represents the frequency components, the $T_i$ are the individual Time-Of-Arrival (TOA) data values and N is the last TOA value collected.

Disclosed are three possible methods of reducing the number of computations involved with the modification of the Discrete Fourier Transform (DFT) equation to facilitate its use with Radar Time-Of-Arrival (TOA) to extract periodic properties of radar signals. This is particularly applicable to radar pulse trains which are interleaved in time and where each individual pulse train may be staggered or jittered in time so that a time domain deinterleaving scheme must be employed. A spectral estimator can be computed by taking the modulus of the DFT of the time series data and extending the periodogram estimator by making a slight modification of the DFT equation.

8 Claims, 5 Drawing Sheets

SPECTRAL ESTIMATION OF RADAR TIME-OF-ARRIVAL PERIODICITIES

RIGHTS OF THE GOVERNMENT

The invention described herein may be manufactured and used by or for the Government of the United States for all governmental purposes without the payment of any royalty.

This application is a continuation-in-part of application Ser. No. 07/986,166, filed Dec. 3, 1992, now abandoned.

BACKGROUND OF THE INVENTION

The present invention relates generally to spectral estimation of radar time-of-arrival periodicities, or more particularly to a method to extract the periodic properties (or Pulse Repetition Intervals (PRIs)) of radar signals whose time-of-arrival at an airborne platform have been time tagged by an Electronic Warfare (EW) receiver.

An EW receiver time tags the arrival of radar pulses to extract the Pulse Repetition Interval. If the receiver is exposed to a single radar signal which is stable in time as in FIG. 1, the PRI is easily calculated by taking the time difference between successive time-of-arrival samples. In practice, many radar pulse trains are interleaved in time and each individual pulse train may be staggered or jittered in time. Under these conditions the simple time-difference-of-arrival (TDOA) scheme presented above fails to give the correct PRIs. In this case a more complicated time domain deinterleaving scheme must be employed. The periodogram spectral estimator which is computed by taking the modulus of the Discrete Fourier Transform (DFT) of time series data is a simple and efficient method for revealing periodicities. The following U. S. Pat. Nos. are of interest.

3,955,200—Miller
4,394,642—Currie et al
4,516,220—Baumann
4,518,947—Poston et al
4,568,915—Gutleber
4,721,958—Jenkin
4,879,561—Inkol
4,918,455—Maier
5,056,105—Darmon et al
5,063,385—Caschera
5,115,246—Thomas, Jr. et al Baumann discloses a pulse deinterleaving signal processor and method wherein the spectral signature of different pulses are stored in target files, and the time interval between pulses is calculated from the time of arrival of each pulse. The time interval between pulses from a common source can be determined through use of the processor.

Jenkin discloses a real-time pulse processor utilizing a folded shift register to perform the deinterleaving. The interpulse pulse repetition (PRI) is determined for use in identifying an emitter. The apparatus first deinterleaves a signal that comprises a plurality of interleaved pulse trains into its constituent pulse trains, and then identifies the emitter which transmitted each pulse train.

Inkol discloses a filter system for radar applications which permits observed data measurements for a multiplicity of radar emitters to be deinterleaved and stored in a buffer memory. It allows data corresponding to any one of the radar emitters to be accessed for further analysis.

Maier discloses an associative hierarchial deinterleaver which generates its own models based on the signals received. It groups signal pulses which have at least one similar parameter; it predicts a value for a different parameter for other signal pulses which have yet to be associated with the group; it associates similar signals depending on parameters; and it reports an indication of the parameters of the group after a threshold number of pulses is associated with the group.

Darmon et al disclose an interleaving method for a digital transmission system where deinterleaving is performed symmetrically by means of an inverse pilot sequence suitable for reconstituting successive code words.

Caschera discloses a radar warning receiver compressed memory histogrammer for initial processing of the received data for quickly determining the numbers and types of emitters in a system's environment.

The remaining references are for general background material.

SUMMARY OF THE INVENTION

An objective of the invention is to provide a method to extract the periodic properties (or Pulse Repetition Intervals (PRIs)) of radar signals whose time-of-arrival at an airborne platform have been time tagged by an Electronic Warfare (EW) receiver.

According to the invention, the Pulse Repetition Intervals are determined using the Discrete Fourier Transform (DFT) written as $$X(k) = \sum_{T_i} e^{\frac{-j2\pi T_i k}{N}}$$

where k represents the frequency components, the $T_i$ are the individual Time-Of-Arrival (TOA) data values and N is the last TOA value collected.

Disclosed are three possible methods of reducing the number of computations involved with the modification of the Discrete Fourier Transform (DFT) equation to facilitate its use with Radar Time-Of-Arrival (TOA) to extract periodic properties of radar signals whose time-of-arrival at an airborne platform have been tagged by an EW receiver. This is particularly applicable to radar pulse trains which are interleaved in time and where each individual pulse train may be staggered or jittered in time so that a time domain deinterleaving scheme must be employed. A spectral estimator can be computed by taking the modulus of the DFT of the time series data and extending the periodogram estimator by making a slight modification of the DFT equation.

DETAILED DESCRIPTION

A copending patent application Ser. No. 08/053,758, filed Apr. 29, 1993, now U.S Pat. No. 5,285,209 issued Feb. 8, 1994, by David L. Sharpin, James B. Y. Tsui and Rudy L. Shaw, titled "Angle-Of-Arrival Measurement Via Spectral Estimation of Radar Time-Of-Arrival Periodicities, hereby incorporated by reference, covers a method using the principle of the present invention.

Figure 1:
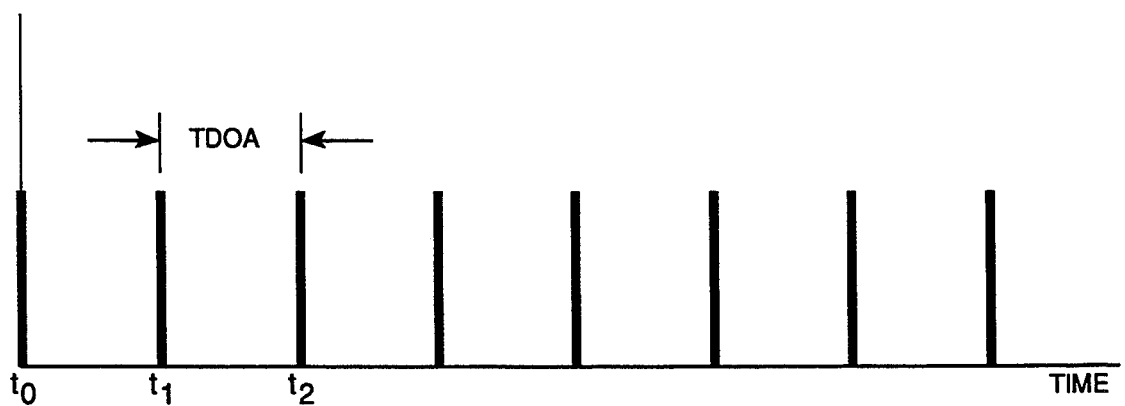
FIG. 1 is a graph showing a single signal Time-Of-Arrival plot.
Figure 5:
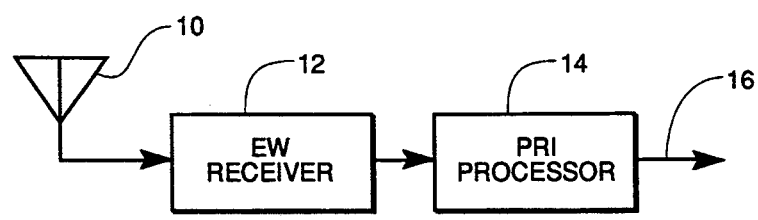
FIG. 5 is a block diagram showing an EW receiving system with a Pulse Repetition Interval processor.

FIG. 5 is a block diagram showing an EW (Electronic Warfare) Receiver 12 having an input from an antenna system 10, and an output to a PRI processor 14 to determine the Pulse Repetition Intervals of one or more trains of radar pulses, with an output of this information on a line 16. The EW receiver 12 time tags the arrival of radar pulses to provide a Time Of Arrival (TOA) for each pulse, and the processor 14 then extracts the Pulse Repetition Interval.

The conventional form of the Discrete Fourier Transform (DFT) of a data set x(n), for n=0,1,...N−1 is given by the following:

$$X(k) = \sum_{n=0}^{N-1} e^{\frac{-j2\pi kn}{N}} \quad (1)$$

This form would be difficult and costly to apply to TOA data since the data points are sparse in time.

In this approach, the DFT is written as $$X(k) = \sum_{T_i} e^{\frac{-j2\pi T_i k}{N}} \quad (2)$$

where k represents the frequency components, the $T_i$ are the individual Time-Of-Arrival (TOA) data values and N is the last TOA value collected. We note here that the TOA value is given an amplitude value of one and thus can be thought of as a delta function at a particular time value. Thus the DFT of an impulse train of TOA values is an impulse train in the frequency domain. The values of k corresponding to the peaks of the modulus of the DFT represent the Pulse Repetition Frequency (PRF) (lowest peak k for a single impulse train) of the impulse train of TOA values and multiples of the PRF (harmonics of the lowest peak k).

As an example of calculating equation (2) consider the following: The number of TOA values in a data set is 64 ranging in time from 0 to 2000 microseconds ($\mu s$) with a TOA resolution of 1 $\mu s$, thus N=2000. In the conventional DFT the inner product would have to be calculated over 2000 time samples to obtain one component of k. In this approach the inner product is only calculated over 64 time samples. However, the full 2000 k values must be used as in the conventional DFT. Several possible approaches to reduce the number of operations in this computation are illustrated below.

1. If approximate values of the PRFs are known a priori then only certain k values need to be computed and searched.
2. First perform equation (2) on a coarse set of TOA values and find the dominant sets of k values. Then perform equation (2) on fine resolution TOA values only around the dominant k values.
3. Calculate equation (2) starting from $k_{min}$, through some relatively low k value ($k_1$). Find the lowest k value in this range, then use this value to remove TOA pulses that correspond to the peak k value's PRF. Equation (2) is again calculated, starting from the previous $k_1$ and the process of removal is repeated until the last TOA pulse train is removed.

Figure 2:
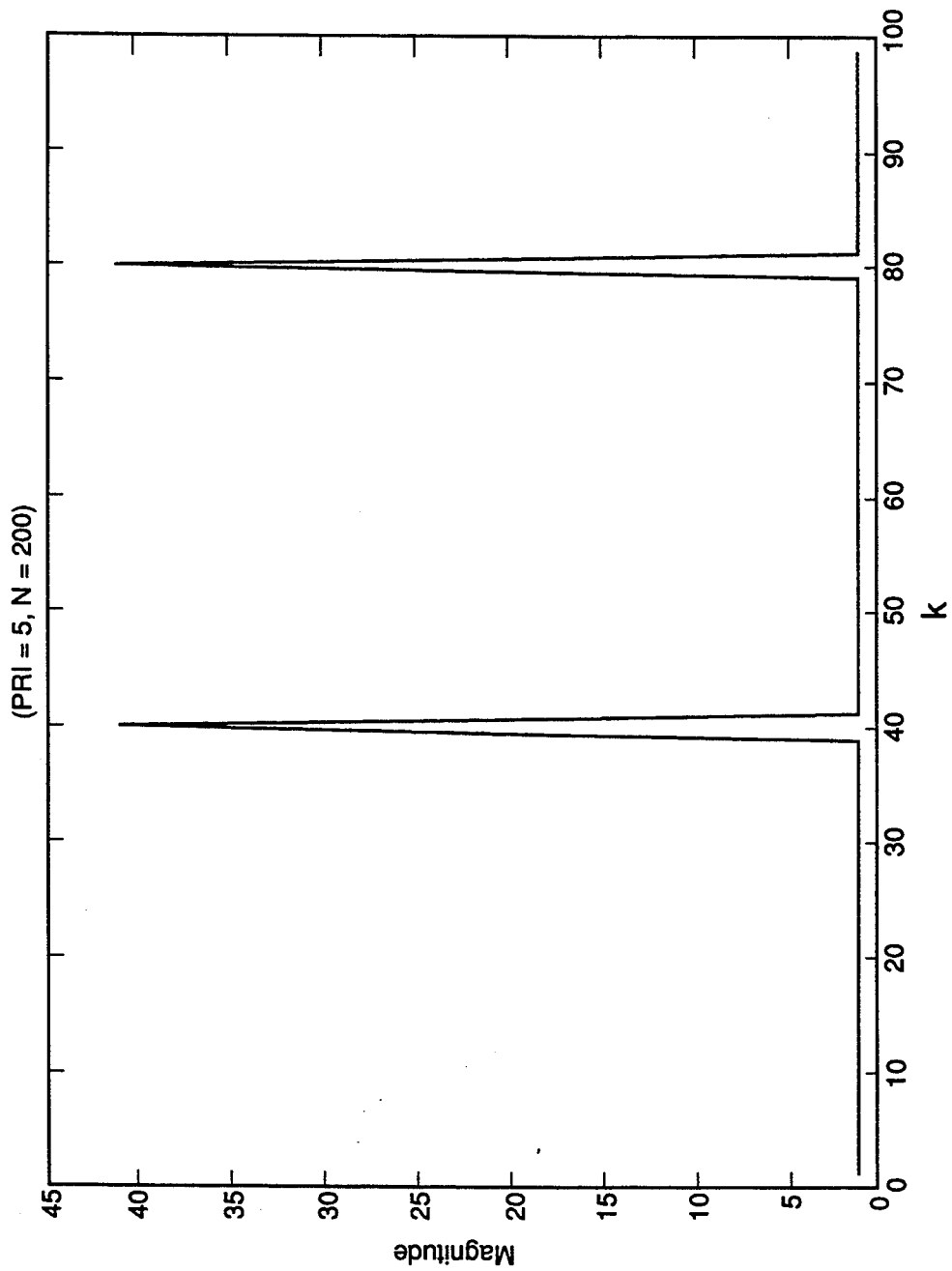
FIGS. 2–4 are graphs showing the frequency domain plots of some pulse trains.
Figure 3:
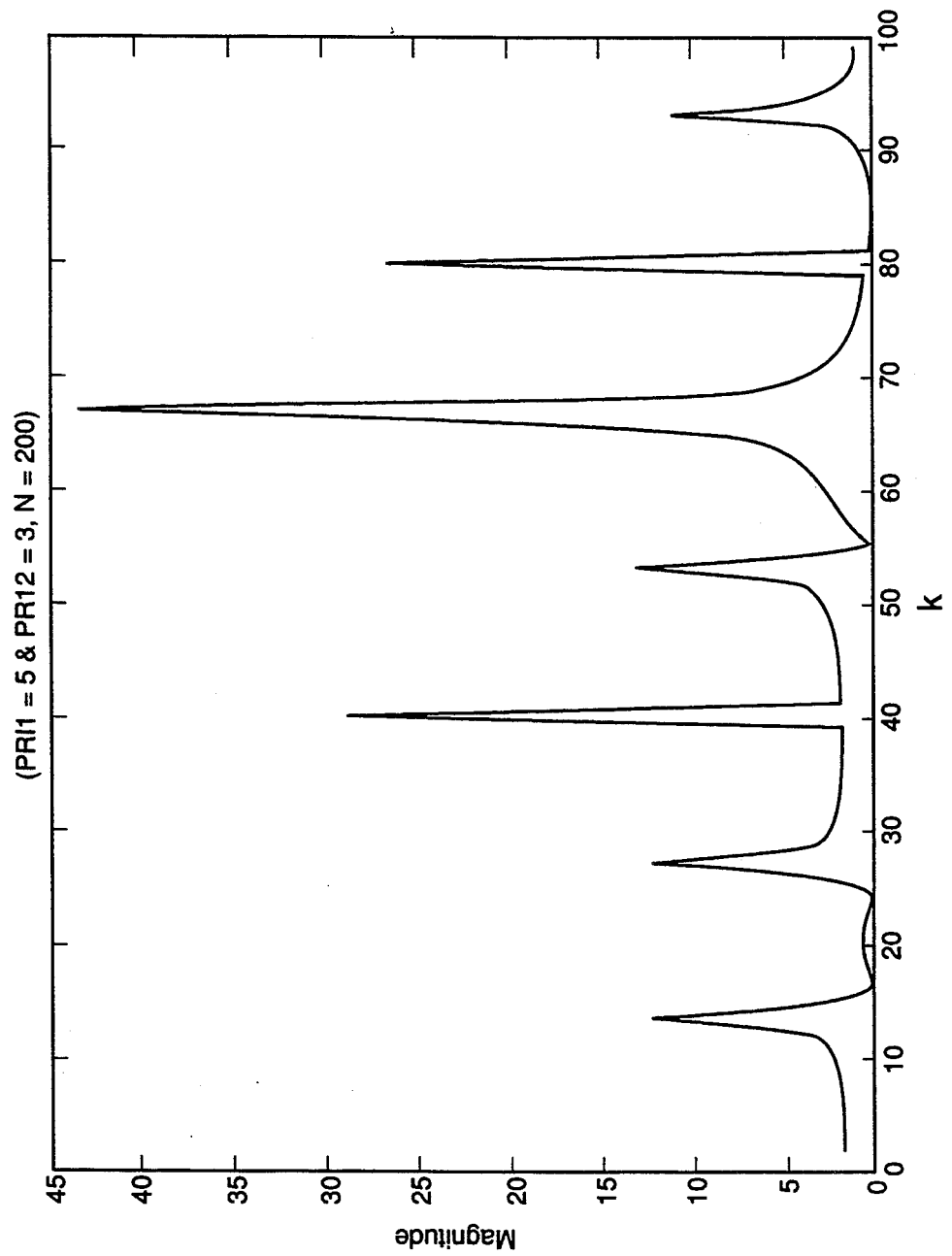
Figure 4:
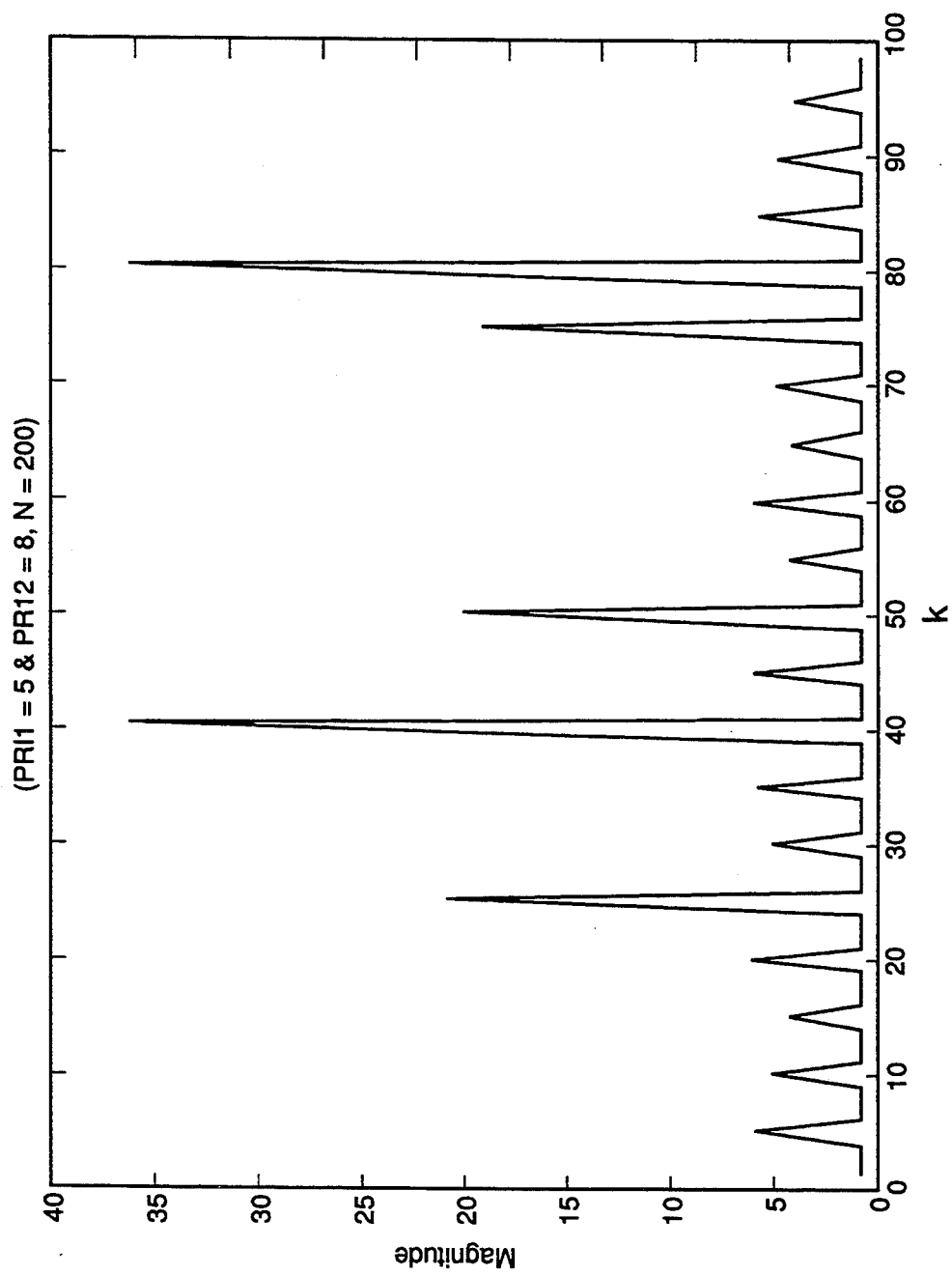

Computer Simulations: To illustrate the functionality and operation of the approach, three simple simulations were run. The following simulation results were generated using MATLAB software. This software generated the TOA pulse trains, calculated equation (2) and performed peak detection in the frequency domain. In the first example a single TOA pulse train was generated with a resolution of 1 time unit, a PRI of 5 and N=200. FIG. 2 shows the frequency domain plot of this pulse train. As can be seen peaks appear at k=40 and k=80. The PRF is given by $$PRF = k \left[ \frac{TOA \text{ RESOLUTION}}{N} \right] \quad (3)$$

where the TOA resolution is 1. Therefore the PRF is 0.2 and the PRI is the reciprocal value of 5. In the next example two stable pulse trains were interleaved. The PRI of the first pulse train was again 5 and the PRI of the second was 3. The plot of the frequency domain is shown in FIG. 3. In this case 7 peaks were detected at k=13, 27, 40, 53, 67, 80 and 93. In this plot we can still see the peaks associated with the second pulse train. We note in this case that the lowest k value is not the PRF of the second TOA train, but corresponds to a PRI of 15. This is due to a periodicity appearing at the lowest common multiple of the PRIs (in this case 15). In this case the dominant peak of the spectrum at k=67 gives a PRI of 2.98. In the next example we change the PRI of the second train to 8. FIG. 4 shows the frequency domain plot. In this case we can see the dominant peaks at 40 and 80 corresponding to pulse train 1 and also dominant peaks at k=25, 50 and 75 corresponding to pulse train 2. We note that k=25 corresponds to a PRF of 0.25 and a PRI of 8. From the last two cases we can see that the lower the PRI, the higher the resultant peaks in the frequency domain. This of course results from the fact that more TOA impulses are being summed for the lower PRI impulse train.

Figure 6:
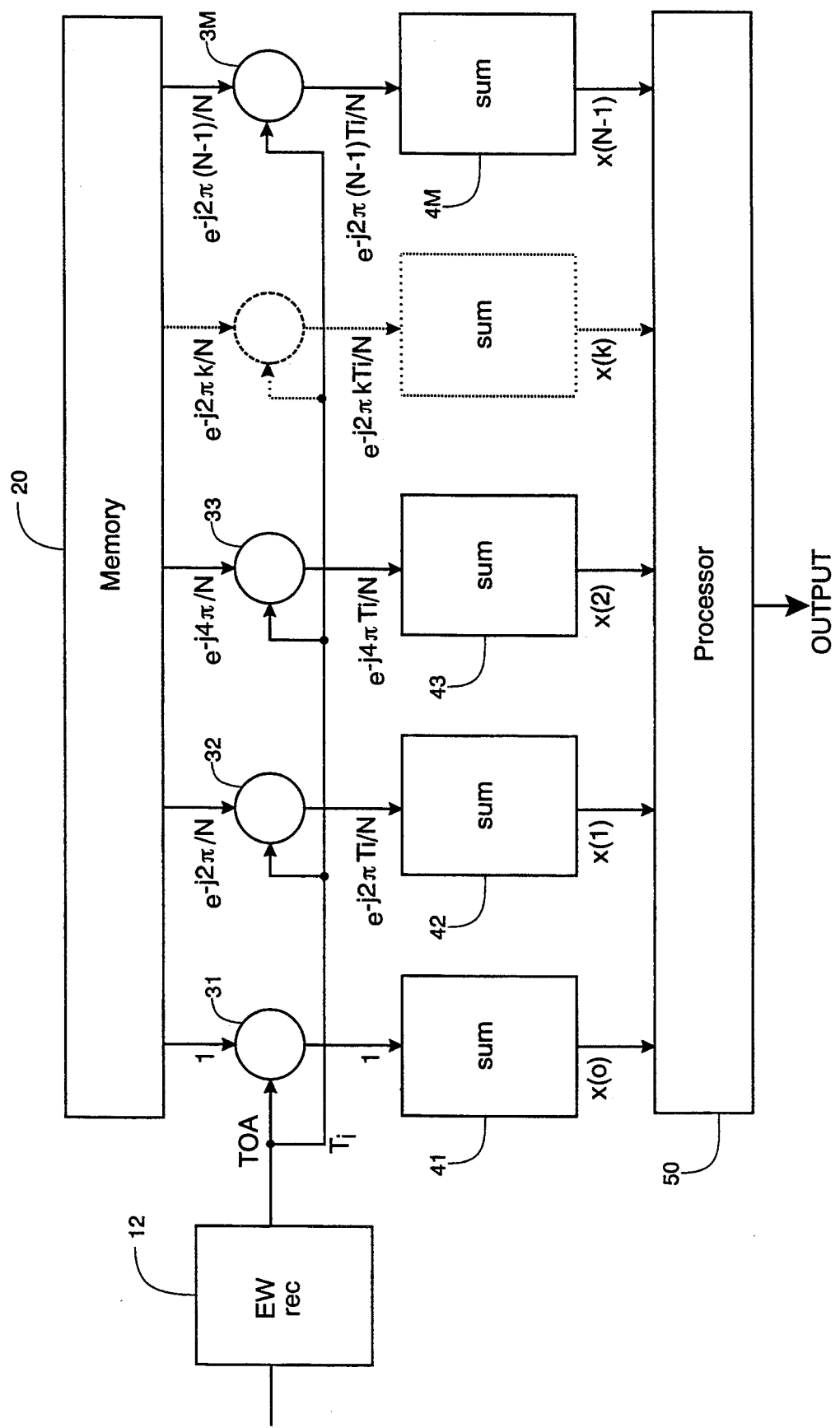

The hardware of the PRI processor 14 is shown in FIG. 6, following the EW receiver 12. The processor 14 can be implemented as follows. All the values of R(k), as shown in equation (4), with N as a fixed value are stored in a memory 20. Whenever a pulse arrives at time $T_i$, it will operate on all of the values of R(k) as shown in equation (5). When the input pulses are arriving, the $R(k)^{T_i}$ will be summed together. The maximum $T_i$ is equal to N−1.

$$R(k) = e^{\left(\frac{-j2\pi k}{N}\right)} \quad (4)$$

$$R(k)^{T_i} = e^{\left(\frac{-j2\pi k T_i}{N}\right)} \quad (5)$$

The values of R(k) from the memory 20 are supplied to devices 31, 32 . . . 3M represented as circles. The individual time-of-arrival data values $T_i$ are supplied to all of the devices 31–3M in parallel. The devices 31–3M perform the operation represented by equation (5), and the resulting values are supplied to respective summing devices 41–4M. Each of the devices 41–4M accumulates the values for the $T_i$ from i=1 up to i=M. The processor 50 can then determine the Pulse Repetition Frequencies (PRFs).

Summary: This invention provides a method of extracting the PRIs of radar signals which are interleaved in the time domain. The invention uses a modification of the DFT equation to facilitate its use with TOA data.

Three possible methods of reducing the number of computations (over the k frequency values) were discussed. Through computer simulation it was shown that this method can be used to extract the PRIs of interleaved TOA pulse trains. We finally note that, interpretation of the frequency domain results, threshold setting and signal stripping will require additional research.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Apparatus to extract the Pulse Repetition Intervals (PRIs) of radar signals comprising a train of radar pulses, wherein said apparatus comprises:

an Electronic Warfare (EW) receiver at an airborne platform which includes means for receiving said radar signals and time tagging the time-of-arrival (TOA) of each radar pulse as a time data value.

a memory in which is stored M values of a quantity $R(k) = e-j2\pi k/N$ for values of k from 0 to (N−1) inclusive;

where k represents the frequency components, the $T_i$ are the individual time-of-arrival (TOA) data values and N is the last TOA value collected; and math means having inputs from the memory supplying said M values and input of the time date values from said Electronic Warfare receiver effective for each time data value $T_i$ for performing the operation $$R(k)^{T_i} = e^{(\frac{-j2\pi kT_i}{N})}$$

on each of the M values R(k) from the memory and supplying the M results to M summing means respectively;

wherein the M summing means include means to accumulate the values of R(k) for all values of $T_i$ in the train of radar pulses, and to supply the resulting M values to further processing means;

wherein the further processing means includes to determine the Pulse Repetition Intervals using a Discrete Fourier Transform (DFT) equation written as $$X(k) = \sum_{T_i} e^{(\frac{-j2\pi T_i k}{N})}.$$

2. Apparatus according to claim 1, including means wherein, approximate values of pulse repetition frequencies being known a priori, only certain k values are computed and searched.

3. Apparatus according to claim 1, including means for first performing said Discrete Fourier Transform (DFT) equation on a coarse set of TOA values and finding dominant sets of k values, and means for then performing said Discrete Fourier Transform (DFT) equation on fine resolution TOA values only around the dominant k values.

4. Apparatus according to claim 1, including means for calculating said Discrete Fourier Transform (DFT) equation starting from a minimum value kmin, through some relatively low k value ($k_1$), means for finding the lowest k value in this range, then using this value to remove TOA pulses that correspond to the peak k value's PRF; said Discrete Fourier Transform (DFT) equation being again calculated, starting from the previous $k_1$ and the process of removal being repeated until the last TOA pulse train is removed.

5. A method to extract the Pulse Repetition Intervals (PRIs) of radar signals comprising a train of radar pulses, wherein said method comprises:

using an Electronic Warfare (EW) receiver at an airborne platform for receiving said radar signals and time tagging the time-of-arrival (TOA) of each radar pulse as a time data value;

storing in a memory M values of a quantity $R(k)=e-j2\pi k/N$ for values of k from 0 to (N−1) inclusive;

where k represents the frequency components, the $T_i$ are the individual time-of-arrival (TOA) data values and N is the last TOA value collected;

using inputs from the memory supplying said M values and input of the time data values from said Electronic Warfare receiver effective for each time data value $T_i$ and performing the operation $$R(k)^{T_i} = e^{(\frac{-j2\pi kT_i}{N})}$$

on each of the M values R(k) from the memory and supplying the M results to M summing means respectively; and using the M summing means to accumulate the values of R(k) for all values of $T_i$ in the train of radar pulses, and supplying the resulting M values to further processing means;

wherein in the further processing means the Pulse Repetition Intervals are determined using a Discrete Fourier Transform (DFT) equation written as $$X(k) = \sum_{T_i} e^{(\frac{-j2\pi T_i k}{N})}.$$

6. A method according to claim 5, wherein approximate values of pulse repetition frequencies being known a priori, only certain k values are computed and searched.

7. A method according to claim 5, comprising first performing said Discrete Fourier Transform (DFT) equation on a coarse set of TOA values and finding dominant sets of k values, and then performing said Discrete Fourier Transform (DFT) equation on fine resolution TOA values only around the dominant k values.

8. A method according to claim 5, comprising calculating said Discrete Fourier Transform (DFT) equation starting from a minimum value $k_{min}$, through some relatively low k value ($k_1$), finding the lowest k value in this range, then using this value to remove TOA pulses that correspond to the peak k value's PRF; said Discrete Fourier Transform (DFT) equation being again calculated, starting from the previous $k_1$ and the process of removal being repeated until the last TOA pulse train is removed.

* * * * *